United States Patent
Hou et al.

(10) Patent No.: US 9,338,367 B2
(45) Date of Patent: May 10, 2016

(54) PROCESSING METHOD OF SCENE IMAGE OF DEVICE WITH SHOOTING FUNCTION, DEVICE WITH SHOOTING FUNCTION AND STORAGE MEDIUM

(71) Applicants: HISENSE ELECTRIC CO., LTD., Qingdao, Shandong (CN); HISENSE USA CORPORATION, Suwanee, GA (US); HISENSE INTERNATIONAL CO., LTD., Qingdao, Shandong (CN)

(72) Inventors: Guilin Hou, Shandong (CN); Fei Huang, Shandong (CN); Xuebin Sun, Shandong (CN)

(73) Assignees: Hisense Electric Co., Ltd., Qingdao, Shandong (CN); Hisense USA Corporation, Suwanee, GA (US); Hisense International Co., Ltd., Qingdao, Shandong (CN)

( * ) Notice: Subject to any disclaimer, the term of this patent is extended or adjusted under 35 U.S.C. 154(b) by 0 days.

(21) Appl. No.: 14/547,573

(22) Filed: Nov. 19, 2014

(65) Prior Publication Data
US 2015/0373245 A1 Dec. 24, 2015

(30) Foreign Application Priority Data
Jun. 19, 2014 (CN) .......................... 2014 1 0275537

(51) Int. Cl.
H04N 5/235 (2006.01)
H04N 5/355 (2011.01)
G06K 9/46 (2006.01)

(52) U.S. Cl.
CPC ............... *H04N 5/2353* (2013.01); *G06K 9/46* (2013.01); *G06K 9/4661* (2013.01); *H04N 5/2355* (2013.01); *H04N 5/35581* (2013.01); *G06K 2009/4666* (2013.01)

(58) Field of Classification Search
CPC . H04N 5/2624; H04N 5/2228; H04N 5/2251; H04N 5/2253; H04N 5/2256; H04N 5/23235; H04N 5/23254; H04N 5/2326
USPC ........... 348/208.12, 221.1, 222.1, 229.1, 291, 348/362, E5.053
See application file for complete search history.

(56) References Cited

U.S. PATENT DOCUMENTS

| | | | | |
|---|---|---|---|---|
| 5,625,415 A * | 4/1997 | Ueno | ................. | H04N 5/23212 348/346 |
| 6,670,991 B1 * | 12/2003 | Takagi | ............... | H04N 5/23212 348/345 |
| 9,058,648 B2 * | 6/2015 | Kotchou | ............... | G06T 7/0012 |
| 2001/0048447 A1 * | 12/2001 | Jogo | ........................ | G06T 11/60 345/620 |
| 2004/0227826 A1 * | 11/2004 | Wu | ....................... | H04N 5/2353 348/239 |
| 2005/0174590 A1 * | 8/2005 | Kubo | ..................... | H04N 1/622 358/1.9 |

* cited by examiner

*Primary Examiner* — Hung Lam
(74) *Attorney, Agent, or Firm* — Boyle Fredrickson, S.C.

(57) ABSTRACT

One or more embodiments of the present application provide a processing method of a scene image of a device with a shooting function, the device with the shooting function and a storage medium. The method includes: determining first and second combined regions in a pre-shot image of a shot scene according to gray values of pixels in the pre-shot image; determining first and second exposures according to the determined first and second combined regions respectively; adjusting respectively gray values of pixels in a first image region corresponding to the first combined region in a first image shot at the first exposure, and gray values of pixels in a second image region corresponding to the second combined region in a second image shot at the second exposure; and splicing the two adjusted image regions together to obtain the scene image.

12 Claims, 5 Drawing Sheets

PROCESSING METHOD OF SCENE IMAGE OF DEVICE WITH SHOOTING FUNCTION, DEVICE WITH SHOOTING FUNCTION AND STORAGE MEDIUM

CROSS-REFERENCES TO RELATED APPLICATIONS

The present application claims priority from Chinese Patent Application No. 201410275537.9, filed with the Chinese Patent Office on Jun. 19, 2014 and entitled "Processing method and device of scene image", which is hereby incorporated by reference in its entirety.

FIELD

The disclosure relates to the field of image processing technologies, and particularly to a processing method of a scene image of a device with a shooting function, the device with the shooting function and a storage medium.

BACKGROUND

The requirements of users on image quality are increasingly higher, and the demands on high-performance experience of devices with the shooting function are increasingly stronger.

However, most devices with the shooting function are designed and used in accordance with the most common light environments, for example, when the most common digital camera, in the environment with adequate light, is used for shooting scenes with small contrast, such attribute settings as aperture, shutter or the like may be adjusted to perform the best shooting operation so as to obtain a high-quality image effect.

SUMMARY

At one aspect, one or more embodiments of the disclosure provide a processing method of a scene image of a device with a shooting function, which includes:

determining a first combined region and a second combined region in a pre-shot image of a shot scene according to gray values of respective pixels in the pre-shot image, wherein the first combined region contains at least one highlight region, and a remaining region excluding the first combined region in the pre-shot image is the second combined region;

determining a first exposure according to a mean value of gray values of respective pixels in the first combined region, and determining a second exposure according to a mean value of gray values of respective pixels in the second combined region;

shooting the shot scene respectively at the first exposure and the second exposure to obtain a first image and a second image;

adjusting respectively gray values of respective pixels in a first image region corresponding to the first combined region in the first image, and gray values of respective pixels in a second image region corresponding to the second combined region in the second image;

splicing the adjusted first image region and the adjusted second image region to obtain the scene image of the shot scene.

At another aspect, one or more embodiments of the disclosure further provide a device with a shooting function, which includes:

a memory; and
one or more processors,
wherein the memory stores computer-readable program codes, and the one or more processors are used to execute the computer-readable program codes to implement:

determining a first combined region and a second combined region in a pre-shot image of a shot scene according to gray values of respective pixels in the pre-shot image, wherein the first combined region contains at least one highlight region, and a remaining region excluding the first combined region in the pre-shot image is the second combined region:

determining a first exposure according to a mean value of gray values of respective pixels in the first combined region, and determining a second exposure according to a mean value of gray values of respective pixels in the second combined region;

shooting the shot scene respectively at the first exposure and the second exposure to obtain a first image and a second image;

adjusting respectively gray values of respective pixels in a first image region corresponding to the first combined region in the first image, and gray values of respective pixels in a second image region corresponding to the second combined region in the second image;

splicing the adjusted first image region and the adjusted second image region to obtain the scene image of the shot scene.

Yet another aspect, one or more embodiments of the disclosure further provide a storage medium storing computer-readable program codes, wherein the computer-readable program codes are executed by one or more processors to implement:

determining a first combined region and a second combined region in a pre-shot image of a shot scene according to gray values of respective pixels in the pre-shot image, wherein the first combined region contains at least one highlight region, and a remaining region excluding the first combined region in the pre-shot image is the second combined region;

determining a first exposure according to a mean value of gray values of respective pixels in the first combined region, and determining a second exposure according to a mean value of gray values of respective pixels in the second combined region;

shooting the shot scene respectively at the first exposure and the second exposure to obtain a first image and a second image:

adjusting respectively gray values of respective pixels in a first image region corresponding to the first combined region in the first image, and gray values of respective pixels in a second image region corresponding to the second combined region in the second image;

splicing the adjusted first image region and the adjusted second image region to obtain the scene image of the shot scene.

BRIEF DESCRIPTION OF THE DRAWINGS

In order to illustrate technical solutions in the embodiments of the disclosure more clearly, accompanying drawings which need be used in the description of the embodiments will be introduced below in brief. Apparently, the accompanying drawings described below are merely one or more embodiments of the disclosure, based on which other drawings may be obtained by those ordinary skilled in the art without any creative effort.

FIG. 3(*b*) is a schematic diagram of a simplified pre-shot image and a gray thereof of a shot scene in one or more embodiments of the disclosure;

FIG. 4(*b*) is a schematic diagram of a second image shot at a second exposure in one or more embodiments of the disclosure;

DETAILED DESCRIPTION OF THE EMBODIMENTS

Figure 1:
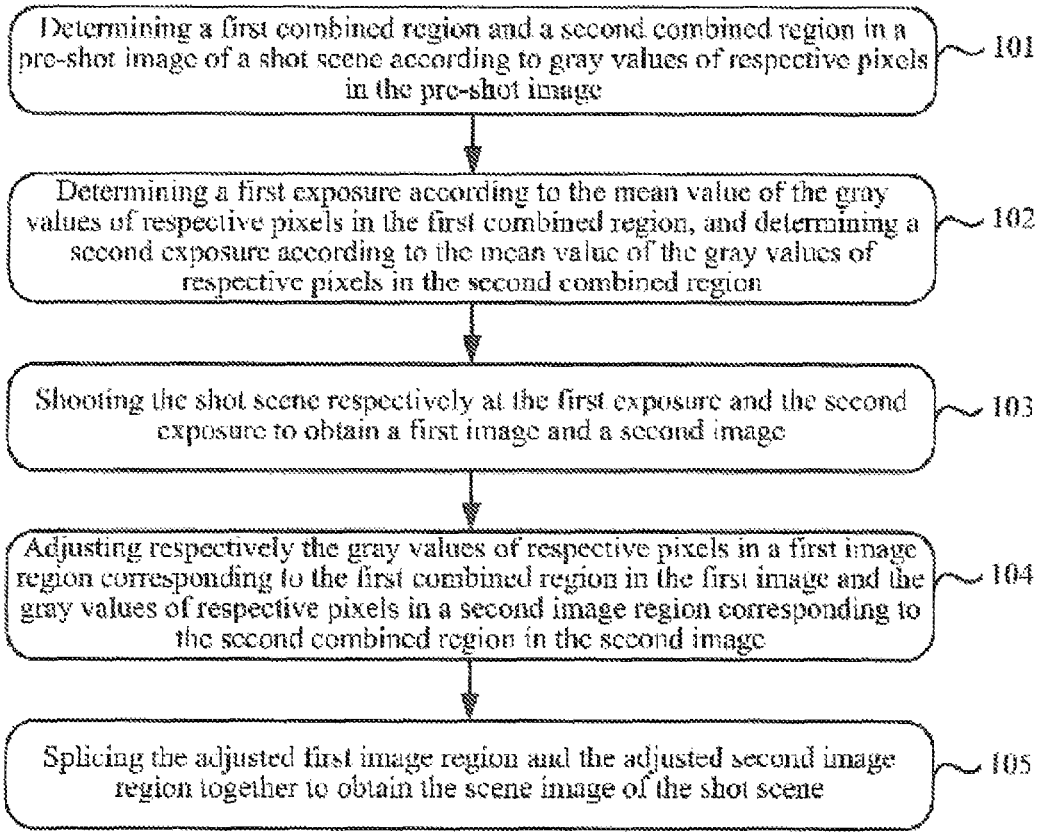
FIG. 1 is a schematic flow chart of a processing method of a scene image of a device with a shooting function according to one or more embodiments of the disclosure.

In order to make the purposes, technical solutions and advantages of the disclosure clearer, the disclosure will be further described below in combination with the accompanying drawings. Apparently, the embodiments described are merely a part, but not all of the embodiments of the disclosure. All the other embodiments, obtained by those ordinary skilled in the art based on the embodiments of the disclosure without any creative effort, fall into the protection scope of the disclosure.

In one or more embodiments of the disclosure, a scene image of a shot scene may be obtained by obtaining the gray values of respective pixels in a pre-shot image of the shot scene, determining a first exposure and a second exposure respectively according to a determined first combined region and a determined second combined region, adjusting respectively the gray values of respective pixels in a first image region corresponding to the first combined region in a first image shot at the first exposure and the gray values of respective pixels in a second image region corresponding to the second combined region in a second image shot at the second exposure, and splicing the adjusted first image region and the adjusted second image region together. In one or more embodiments, one exposure may be calculated for multiple highlight regions of the first combined region, and the other exposure may be calculated for the second combined region, where the values of the two exposures may be different, and images shot respectively at the two exposures may be different as well. For example, in the image shot at the first exposure, the scene details of the first combined region in the shot scene may be retained to a larger extent, and a part of the scene details of the second combined region may be lost due to underexposure; and in the image shot at the second exposure, the scene details of the second combined region in the shot scene may be retained to a larger extent, and the scene details in the first combined region may be retained but may suffer image saturation distortion due to overexposure. In one or more embodiments, the first image region in the first image and the second image region in the second image may be obtained respectively, and the gray values of respective pixels in the first image region in the first image and the gray values of respective pixels in the second image region in the second image may be adjusted respectively by use of a gray adjusting formula involved in one or more embodiments of the disclosure, so that the difference between the minimum gray value among the gray values of the respective pixels in the first image region of the first image and the maximum gray value among the gray values of the respective pixels in the second image region of the second image is close to the difference between the minimum gray value among the gray values of the respective pixels in the first combined region and the maximum gray value among the gray values of the respective pixels in the second combined region in the pre-shot image, that is, the gray scale between bright and dark regions in the image is kept to be consistent with the gray scale between bright and dark regions in the shot scene as much as possible. Thus the combined image may be closer to the shot scene, and the quality of the image may be higher. In one or more aspects of one or more embodiments of the disclosure, the scene details of all regions in the shot image may be ensured to be consistent as much as possible.

It should be noted that, in the solutions of one or more embodiments of the disclosure, a shot image of a shot scene with larger contrast may be mainly adjusted, so that the gray scale between the bright and dark regions in the adjusted image is not great and close to the difference of the gray scale between the bright and dark regions in the pre-shot image of the real shot scene as much as possible to obtain a high-quality image. Then, in one or more embodiments of the disclosure, an image obtained by shooting a shot scene with small contrast may be also adjusted to further optimize the shot image more finely and obtain a better high-quality image under the condition that the gray scale between the bright and dark regions is not great.

As shown in FIG. 1, a processing method of a scene image of a device with a shooting function according to one or more embodiments of the disclosure may include the following operations:

Operation 101: determining a first combined region and a second combined region in a pre-shot image of a shot scene according to gray values of respective pixels in the pre-shot image.

The first combined region may contain at least one highlight region, and the remaining region excluding the first combined region in the pre-shot image may be the second combined region.

For example, after the shot scene is determined, a pre-shot image cached in a shooting device may be obtained by utilizing the pre-shooting function of the shooting device, and the gray values of respective pixels in the pre-shot image are obtained. It should be noted that the gray values may be integers or non-integers, and this is not limited in the disclosure. However, in one or more embodiments of the disclosure, in order to conveniently illustrate the solutions of the disclosure, it is taken as an example for description that the gray values are integers. In addition, the value range of the gray values of the image may be set to [0, 100].

In one or more embodiments, an intermediate gray value may be determined according to the mean value of the maximum gray value and the minimum gray value among the gray values of the respective pixels in the pre-shot image; a region, of which the region area is larger than a preset threshold value and in which gray values of respective pixels are all larger than the intermediate gray value, in the pre-shot image may be determined as the highlight region; and at least one highlight region may be determined as the first combined region.

For example, the maximum gray value and the minimum gray value among the gray values of the respective pixels in the pre-shot image are averaged, and the obtained mean value may be used as the intermediate gray value. However, the manner of determining the intermediate gray value may be flexibly selected and is not limited to the solution described above, for example, the intermediate gray value may also be determined in one of the following manners:

(1) the respective pixels are sequenced according to the gray value of each pixel in the pre-shot image, and the gray value of the pixel at the middle position of the sequence may be used as the intermediate gray value; or (2) the gray value with the largest weight value among the gray values of the respective pixels in the pre-shot image may be used as the intermediate gray value.

Figure 3:
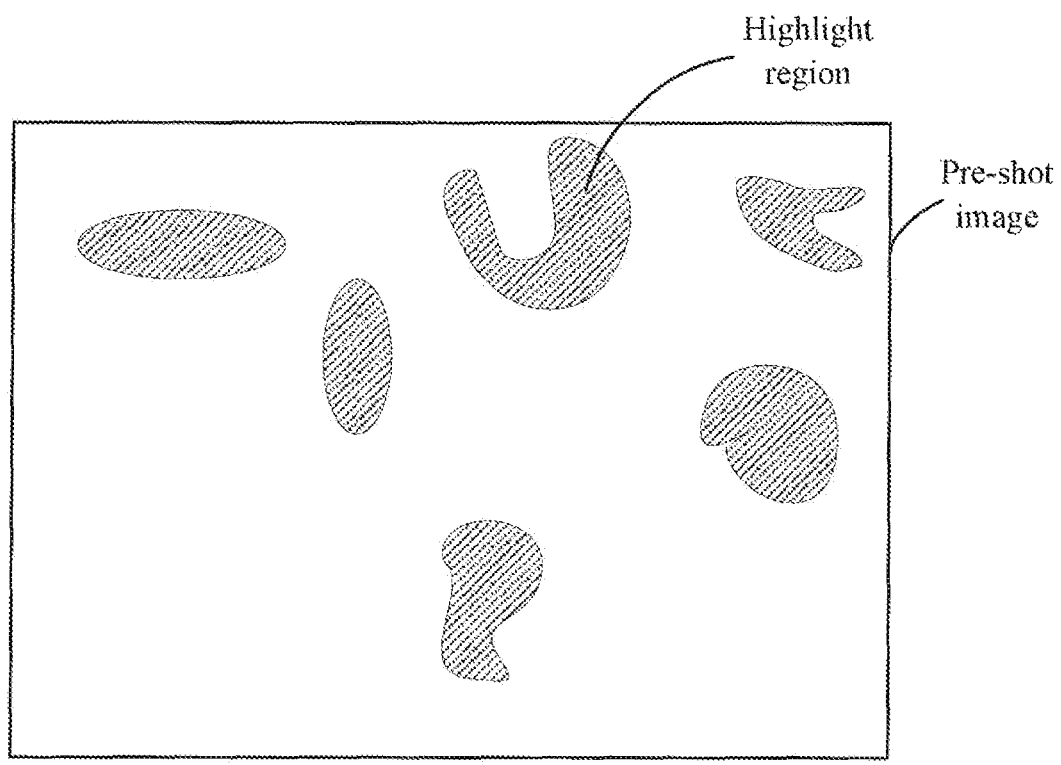
FIG. 3(*a*) is a schematic diagram of a determined pre-shot image and a gray thereof of a shot scene in one or more embodiments of the disclosure.
Figure 3:
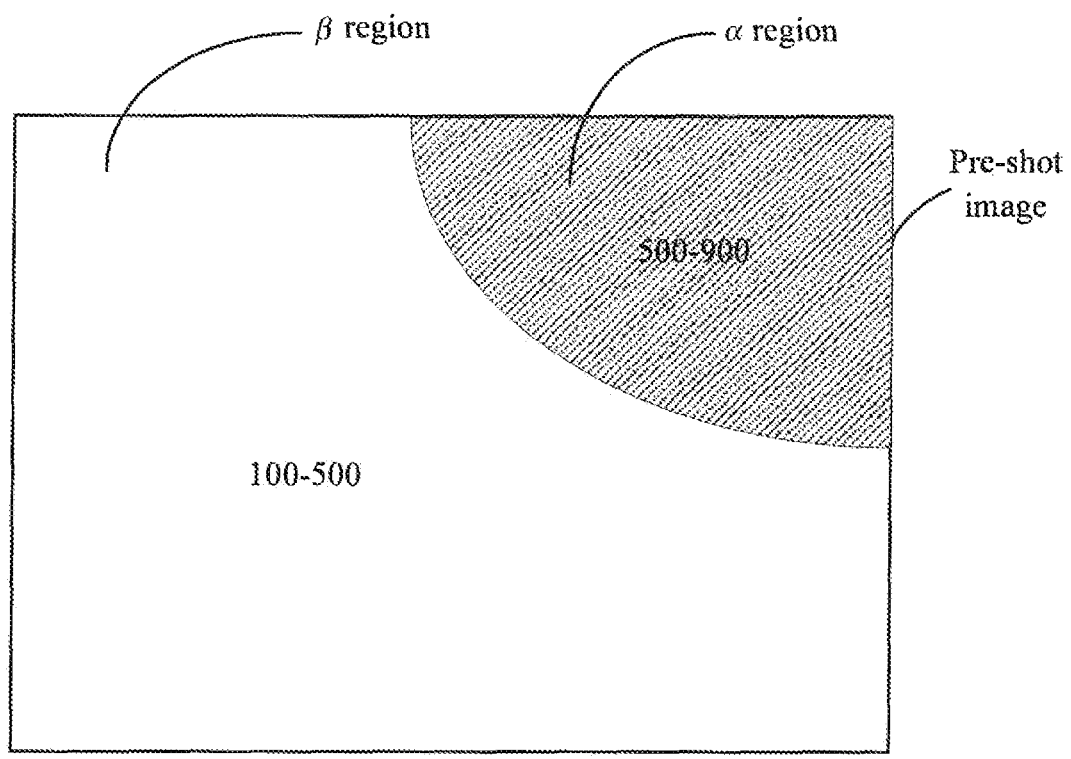

In the process of obtaining the gray values, the corresponding region, of which the area is larger than a preset threshold value and in which the gray values are all larger than the intermediate gray value, in the pre-shot image may be determined as the highlight region, where the preset threshold value may be set according to the processing capacity of the shooting device, and the value is $\frac{1}{10000}$ of the total area of the pixels in the screen of the shooting device in general. Schematic diagrams of a pre-shot image involved in one or more embodiments of the disclosure are shown in FIG. 3. In the pre-shot image, multiple highlight regions (for example, diagonal stripe regions in the Figure) may be determined, all the highlight regions may be collectively referred to as the first combined region, and the remaining regions excluding the first combined region may be collectively referred to as the second combined region, where the first combined region and the second combined region are merely defined for distinguishing and not combinations in the true sense.

Operation 102: determining a first exposure according to the mean value of the gray values of respective pixels in the first combined region, and determining a second exposure according to the mean value of the gray values of respective pixels in the second combined region.

In one or more embodiments, in the operation 102, all gray values contained in the first combined region may be counted, the mean value of the gray values of the first combined region may be determined in a weight averaging manner, and a corresponding table of exposures stored in the shooting device is looked up by using the mean value to thereby determine the first exposure. Similarly, the second exposure is determined in the same manner.

Operation 103: shooting the shot scene respectively at the first exposure and the second exposure to obtain a first image and a second image.

In one or more embodiments, in the operation 103, the shooting device may be set respectively according to the first exposure and the second exposure determined in the operation 102, and two shot images are obtained through the shooting operation respectively.

Operation 104: adjusting respectively the gray values of respective pixels in a first image region corresponding to the first combined region in the first image and the gray values of respective pixels in a second image region corresponding to the second combined region in the second image.

The first exposure may be determined according to the mean value of the gray values of the first combined region, and the scene details in the first combined region may be retained to a larger extent in the first image shot at the first exposure, so the first image region corresponding to the first combined region in the first image needs to be obtained; similarly, the second exposure may be determined according to the mean value of the gray values of the second combined region, and the scene details in the second combined region may be retained to a larger extent in the second image shot at the second exposure, so the second image region corresponding to the second combined region in the second image needs to be obtained.

Figure 2:
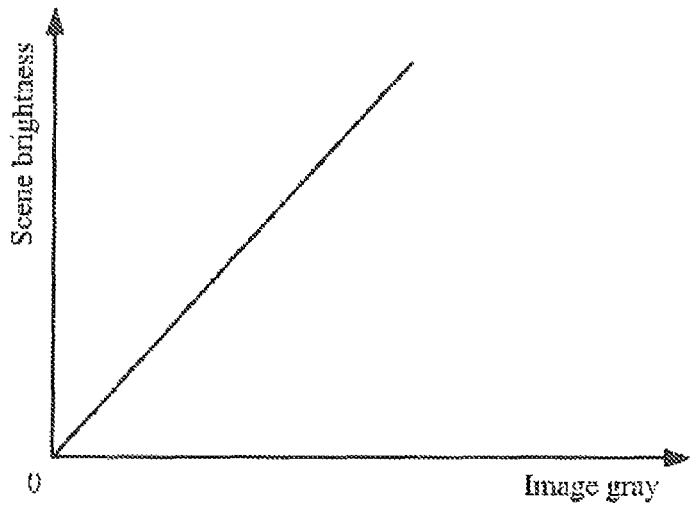
FIG. 2 is a schematic diagram of a linear relation between brightness values and gray values according to one or more embodiments of the disclosure.

It should be noted that, in one or more embodiments of the disclosure, the brightness value of the shot scene and the gray value in the pre-shot image obtained by shooting the shot scene may form a certain linear relation, as shown in FIG. 2, or may alternatively form a non-linear relation. In terms of the image, the gray value thereof indicates the brightness and is a specific term used for describing the image brightness.

The first image region and the second image region may be obtained according to different exposures. Although the details of the shot scene may be retained to a larger extent, the direct combination and splicing operation may cause the gray distortion of the image. Thus the gray of the first image region and the gray of the second image region may be adjusted respectively.

In one or more embodiments, the gray adjusting coefficient may be determined according to the maximum gray value and the minimum gray value among the gray values of the respective pixels in the first image region and the maximum gray value and the minimum gray value among the gray values of the respective pixels in the second image region.

Gray values in the first image region and all gray values in the second image region may be adjusted respectively according to the gray adjusting coefficient and a gray adjusting formula.

For example, the gray adjusting formula may be:

$$a'=a-(a-a_0)*k$$

where $a'$ refers to an adjusted gray value; $a$ refers to an unadjusted gray value; $a_0$ refers to an adjustment approaching value, if the gray value is decreased, the value of $a_0$ is a pre-defined minimum gray value, and if the gray value is increased, the value of $a_0$ is a pre-defined maximum gray value; $k$ refers to the gray adjusting coefficient.

In one or more embodiments, the gray adjusting coefficient $k$ is determined in the following manner: determining a total gray adjusting amount $Q=M-N$ according to the difference between the maximum gray value M among the gray values of the respective pixels in the second image region and the minimum gray value N among the gray values of the respective pixels in the first image region; determining the difference $Q_1$ between the maximum gray value and the minimum gray value among the gray values of the respective pixels in the first combined region; determining the difference $Q_2$ between the maximum gray value and the minimum gray value among the gray values of the respective pixels in the second combined region; when adjusting all the gray values in the first image region, determining the gray adjusting coefficient to be $$k=\frac{M-N}{|N-a_0|}*\frac{Q_2}{Q_1+Q_2};$$

when adjusting all the gray values in the second image region, determining the gray adjusting coefficient to be $$k = \frac{M-N}{|M-a_0|} * \frac{Q_1}{Q_1+Q_2}.$$

After the gray adjustment described above, all the gray values of the first image region may be adjusted and the adjustment manner is uniform, that is, the gray values are all increased or the gray values are all decreased; all the gray values of the second image region are also adjusted and the adjustment manner is uniform. When all the gray values of the first image region are increased, all the gray values of the second image region are correspondingly decreased; and when all the gray values of the first image region are decreased, all the gray values of the second image region are correspondingly increased.

After the adjustment operation is performed according to the gray adjusting formula described above, the difference between the minimum gray value among the gray values of the respective pixels in the adjusted first image region and the maximum gray value among the gray values of the respective pixels in the adjusted second image region is defined as an adjusted gray scale A. The gray scale between the minimum gray value among the gray values of the respective pixels in the first combined region and the maximum gray value among the gray values of the respective pixels in the second combined region in the pre-shot image obtained according to the shot scene is B, and the gradient relation between the first combined region and the second combined region in the shot scene is restored to the largest extent. Therefore, in one or more embodiments, in order to be consistent with the shot scene as much as possible, the gray scale A is adjusted to be close to the gray scale B to the largest extent by adopting the adjustment solution described above.

Operation 105: splicing the adjusted first image region and the adjusted second image region together to obtain the scene image of the shot scene.

In one or more embodiments, in the operation 105, after the adjustment operation of the operation 104, the difference between the minimum gray value among the gray values of the respective pixels in the first image region and the maximum gray value among the gray values of the respective pixels in the second image region restores the brightness difference in the shot scene to a larger extent. Thus the adjusted first image region and the adjusted second image region may be spliced and combined together to obtain the scene image corresponding to the shot scene. In this scene image, the scene details of all regions in the shot scene are retained to a larger extent, and the brightness gradient relation between the first combined region and the second combined region in the shot scene is restored to a larger extent, to thereby improve the quality of the image.

Figure 4:
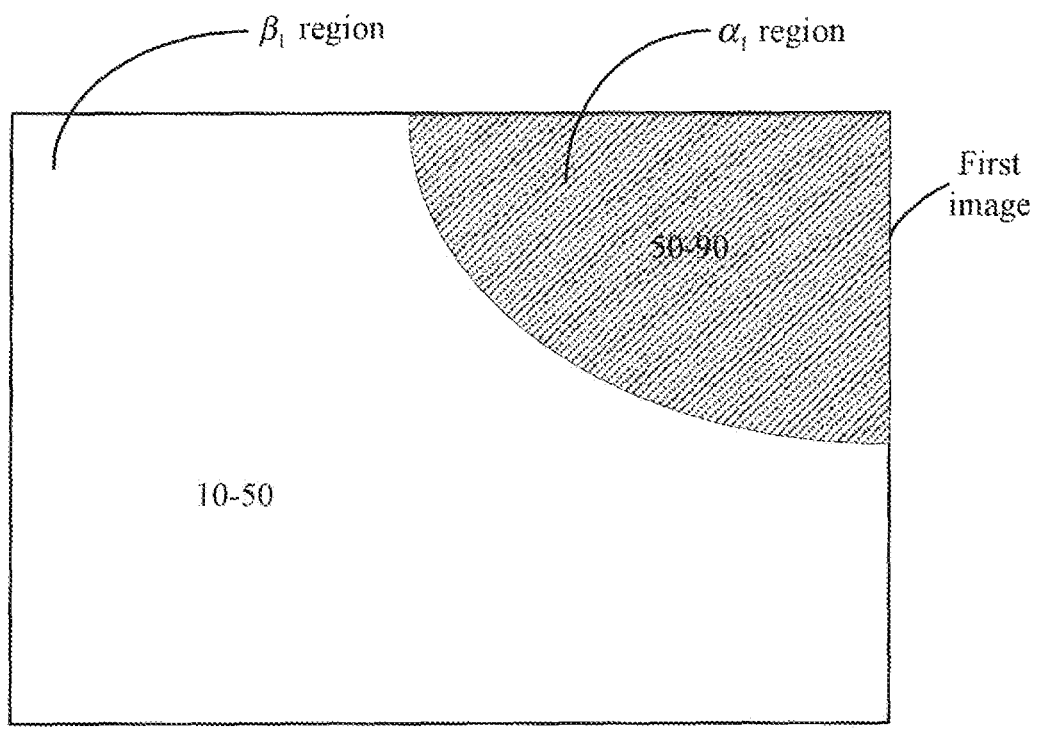
FIG. 4(*a*) is a schematic diagram of a first image shot at a first exposure in one or more embodiments of the disclosure.
Figure 4:
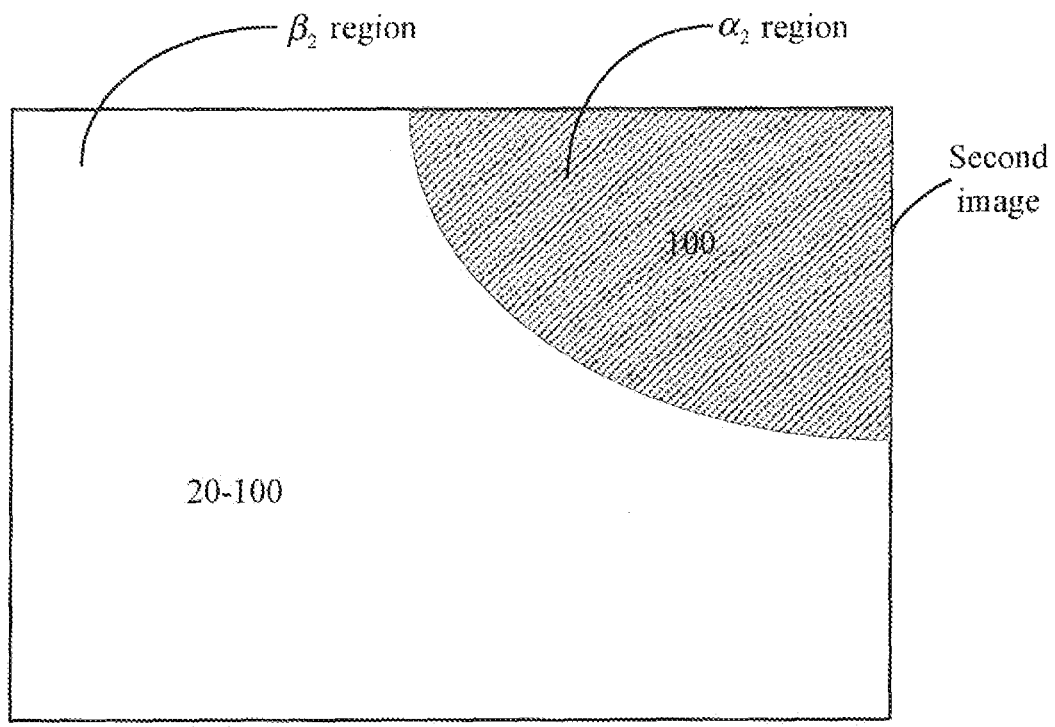

In one or more embodiments of the disclosure, FIG. 3($a$) shows a pre-shot image obtained according to a shot scene, where the contrast of brightness and darkness in the pre-shot image is large, the range of the gray values of respective pixels in the obtained pre-shot image is [100, 900], and multiple highlight regions (as shown by diagonal stripes) exist in the pre-shot image. The intermediate gray value is determined to be 500 based on the maximum gray value and the minimum gray value, then the first combined region in the shot scene is a α region, and the second combined region is a β region. It should be noted that, for convenient illustration and explanation, in one or more embodiments of the disclosure, it is assumed that all highlight regions are adjacent, then the α region and the β region as shown in FIG. 3 ($b$) are obtained. The first exposure is determined according to the mean value of the gray values in the α region, and the second exposure is determined according to the mean value of the gray values in the β region. The shot scene is shot according to the first exposure to obtain the first image as shown in FIG. 4($a$), where the range of the gray values of the $\alpha_1$ region corresponding to the α region is [50, 90], and the range of the gray values of the $\beta_1$ region corresponding to the β region is [10, 50]; the shot scene is shot according to the second exposure to obtain the second image as shown in FIG. 4($b$), where the gray value of the $\alpha_2$ region corresponding to the α region is 100, and the range of the gray values of the $\beta_2$ region corresponding to the β region is [20, 100]. For the obtained first image, the scene details corresponding to the α region of the pre-shot image in the shot scene are retained to the largest extent and correspondingly exist in the $\alpha_1$ region of the first image, while the scene corresponding to the β region of the pre-shot image in the shot scene loses the scene details due to underexposure; for the obtained second image, the scene details corresponding to the β region of the pre-shot image in the shot scene are retained to the largest extent and correspondingly exist in the $\beta_2$ region of the second image, while the scene details of the scene corresponding to the α region of the pre-shot image in the shot scene are distorted due to overexposure, resulting in the gray saturation of the respective pixels of the $\alpha_2$ region of the second image. Therefore the image of the $\alpha_1$ region in the first image and the image of the $\beta_2$ region in the second image are obtained.

Figure 5:
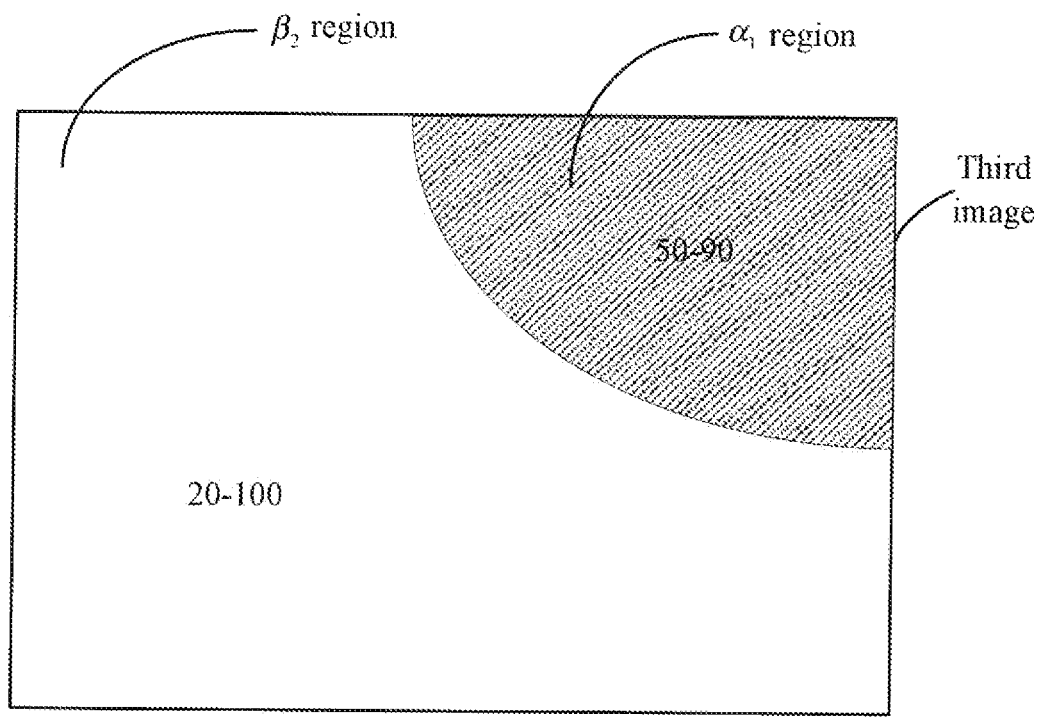
FIG. 5 is a schematic diagram of a scene image obtained by directly combining a $\alpha_1$ region with a $\beta_2$ region in one or more embodiments of the disclosure.

In one or more embodiments, if the image of the $\alpha_1$ region and the image of the $\beta_2$ region are directly combined to form a third image, as shown in FIG. 5, the gray distortion of the formed third image may occur because the difference between the minimum gray value among the gray values of the respective pixels in the $\alpha_1$ region and the maximum gray value among the gray values of the respective pixels in the $\beta_2$ region is inconsistent with the gray scale of the pre-shot image. Therefore the gray values of the pixels in the image of the $\alpha_1$ region and the gray values of the pixels in the image of the $\beta_2$ region need to be adjusted respectively.

In one or more embodiments, since the difference between the minimum gray value among the gray values of the respective pixels in the α region and the maximum gray value among the gray values of the respective pixels in the β region in the shot scene is 0, in order to keep the consistency, the minimum gray value among the gray values of the respective pixels in the $\alpha_1$ region needs to be adjusted to be equal to the maximum gray value among the gray values of the respective pixels in the $\beta_2$ region, for example, the adjustment may be performed in five following operations:

First operation: determining the total gray adjusting amount: the maximum gray value among the gray values of the respective pixels in the $\beta_2$ region minus the minimum gray value among the gray values of the respective pixels in the $\alpha_1$ region, namely, 100−50=50.

Second operation: determining the difference between the maximum gray value and the minimum gray value among the gray values of the respective pixels in the α region, namely, 900−500=400; and determining the difference between the maximum gray value and the minimum gray value among the gray values of the respective pixels in the β region, namely, 500−100=400.

Third operation: determining the gray approaching value for increasing the gray value of the $\alpha_1$ region to be 100, and determining the gray approaching value for decreasing the gray value of the $\beta_2$ region to be 0 because the minimum gray value among the gray values of the respective pixels in the $\alpha_1$ region is smaller than the maximum gray value among the gray values of the respective pixels in the $\beta_2$ region; determining the gray adjusting coefficient of the $\alpha$ region to be $$k = \frac{M-N}{|N-a_0|} * \frac{Q_2}{Q_1+Q_2} = \frac{50}{50} \frac{400}{800} = \frac{1}{2};$$

and determining the gray adjusting coefficient of the $\beta$ region to be $$k = \frac{M-N}{|M-a_0|} * \frac{Q_1}{Q_1+Q_2} = \frac{50}{100} \frac{400}{800} = \frac{1}{4}.$$

Fourth operation: putting the gray adjusting coefficient k=½ into the gray adjusting formula described above, and adjusting the gray value of the $\alpha_1$ region by utilizing the gray adjusting formula: a'=a−(a−$a_0$)*k, where the adjusted minimum gray value is 50−(50−100)½=75 and the adjusted maximum gray value is 90−(90−100)½=95; similarly, putting the gray adjusting coefficient k=¼ into the gray adjusting formula described above, and adjusting the gray value of the $\beta_2$ region by utilizing the gray adjusting formula: a'=a−(a−$a_0$)*k, where the adjusted minimum gray value is 20−(20−0)¼=15 and the adjusted maximum gray value is 100−(100−0)¼=75.

Figure 6:
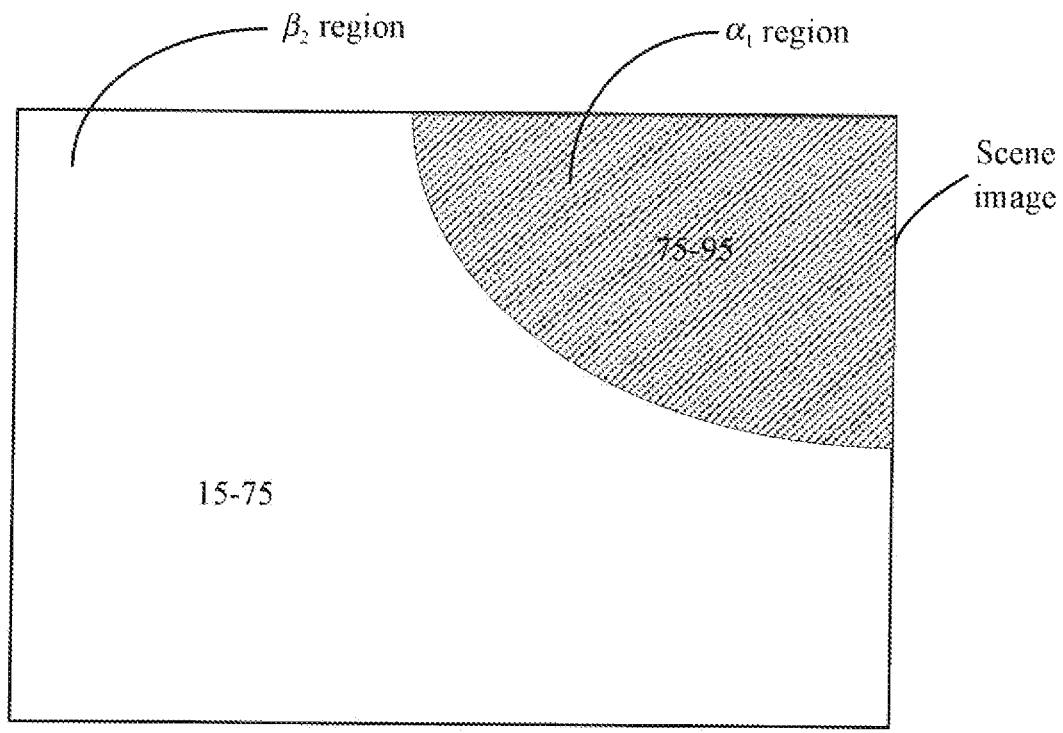
FIG. 6 is a schematic diagram of a scene image obtained by combining a $\alpha_1$ region with a $\beta_2$ region with adjusted grays in one or more embodiments of the disclosure.

Fifth operation: splicing and combining the image of the adjusted $\alpha_1$ region and the image of the adjusted $\beta_2$ region together to obtain the scene image as shown in FIG. 6, where the minimum gray value among the gray values of the respective pixels in the adjusted $\alpha_1$ region is 75, and the maximum gray value among the gray values of the respective pixels in the adjusted $\beta_2$ region is 75 as well, so the difference between the minimum gray value among the gray values of the respective pixels in the adjusted $\alpha_1$ region and the maximum gray value among the gray values of the respective pixels in the adjusted $\beta_2$ region is 0, which is consistent with that of the shot scene, thus retaining the scene details to the largest extent and also adjusting the gray difference between the two spliced regions to thereby avoid the image distortion.

In at least one or more aspects according to one or more embodiments of the disclosure, the processing method of the scene image of the device with the shooting function is provided, so as to avoid the problem of overexposure or underexposure of the image due to the larger contrast of brightness and darkness in the shot scene, so that the scene details of the shot scene may be retained to a larger extent, and in addition, the spliced scene image may be closer to the shot scene and the quality of the image is better.

One or more embodiments of the disclosure further provide a device with the shooting function.

Figure 7:
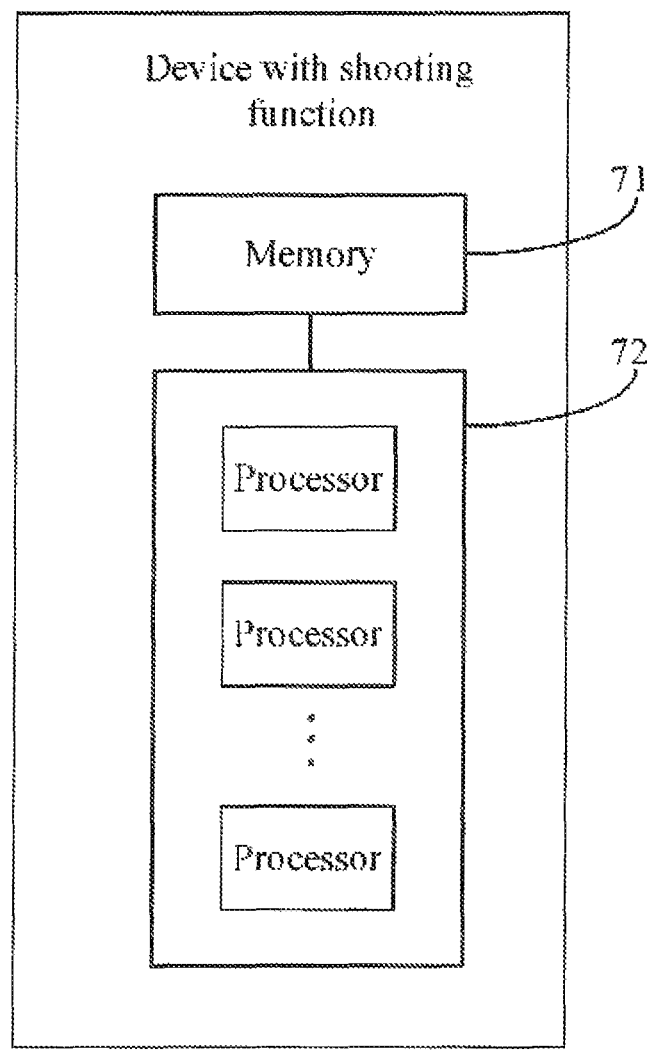
FIG. 7 is a structural schematic diagram of a device with a shooting function according to one or more embodiments of the disclosure.

FIG. 7 is a structural schematic diagram of the device with the shooting function according to one or more embodiments of the disclosure. As shown in FIG. 7, the device with the shooting function may include:

a memory 71; and one or more processors 72, where the memory 71 stores computer-readable program codes, and the one or more processors 72 are used to execute the computer-readable program codes to implement:

determining a first combined region and a second combined region in a pre-shot image of a shot scene according to gray values of respective pixels in the pre-shot image, wherein the first combined region contains at least one highlight region, and a remaining region excluding the first combined region in the pre-shot image is the second combined region;

determining a first exposure according to a mean value of gray values of respective pixels in the first combined region, and determining a second exposure according to a mean value of gray values of respective pixels in the second combined region;

shooting the shot scene respectively at the first exposure and the second exposure to obtain a first image and a second image;

adjusting respectively gray values of respective pixels in a first image region corresponding to the first combined region in the first image, and gray values of respective pixels in a second image region corresponding to the second combined region in the second image;

splicing the adjusted first image region and the adjusted second image region together to obtain the scene image of the shot scene.

In one or more embodiments, the operation of determining the first combined region and the second combined region in the pre-shot image of the shot scene according to the gray values of the respective pixels in the pre-shot image may comprise:

determining an intermediate gray value according to a mean value of a maximum gray value and a minimum gray value among the gray values of the respective pixels in the pre-shot image;

determining a region, of which a region area is larger than a preset threshold value and in which gray values of respective pixels are all larger than the intermediate gray value, in the pre-shot image as a highlight region;

determining at least one highlight region as the first combined region.

In one or more embodiments, the operation of adjusting respectively the gray values of the respective pixels in the first image region and the gray values of the respective pixels in the second image region may comprise:

determining a gray adjusting coefficient according to a maximum gray value and a minimum gray value among the gray values of the respective pixels in the first image region and a maximum gray value and a minimum gray value among the gray values of the respective pixels in the second image region;

adjusting respectively the gray values of the respective pixels in the first image region and the gray values of the respective pixels in the second image region according to the gray adjusting coefficient and a gray adjusting formula.

In one or more embodiments, the gray adjusting formula may be:

$$a'=a-(a-a_0)*k$$

where a' refers to an adjusted gray value; a refers to an unadjusted gray value; $a_0$ refers to an adjustment approaching value, if the gray value is decreased, the value of $a_0$ is a pre-defined minimum gray value, and if the gray value is increased, the value of $a_0$ is a pre-defined maximum gray value; k refers to the gray adjusting coefficient.

For example, the gray adjusting coefficient k may be determined in a following manner:

determining a total gray adjusting amount Q=M−N according to a difference between the maximum gray value M among the gray values of the respective pixels in the second image region and the minimum gray value N among the gray values of the respective pixels in the first image region;

determining a difference $Q_1$ between a maximum gray value and a minimum gray value among the gray values of the respective pixels in the first combined region;

determining a difference $Q_2$ between a maximum gray value and a minimum gray value among the gray values of the respective pixels in the second combined region;

when adjusting the gray values of the respective pixels in the first image region, determining the gray adjusting coefficient to be $$k = \frac{M-N}{|N-a_0|} * \frac{Q_2}{Q_1+Q_2};$$

when adjusting the gray values of the respective pixels in the second image region, determining the gray adjusting coefficient to be $$k = \frac{M-N}{|M-a_0|} * \frac{Q_1}{Q_1+Q_2}.$$

The device with the shooting function according to one or more embodiments of the disclosure may be a digital camera, a handset or any other device with the shooting function.

Using the device with the shooting function according to one or more embodiments of the disclosure, the problem of overexposure or underexposure of the image due to the larger contrast of brightness and darkness in the shot scene may be avoided, and the scene details of the shot scene may be retained to a larger extent; in addition, the spliced scene image may be closer to the shot scene and the quality of the image is better.

In addition, one or more embodiments of the disclosure provide a computer-readable storage medium, where the computer-readable storage medium may be the computer-readable storage medium contained in the memory in the embodiment, or may be the computer-readable storage medium which exists alone and is not assembled into the terminal. The computer-readable storage medium stores one or more programs (in one or more embodiments, the computer-readable storage medium may be one or more magnetic disc storage devices, a flash memory device or other non-volatile solid-state storage devices, a CD-ROM, an optical memory and the like), where the one or more programs are executed by one or more processors to implement the processing method of the scene image of the device with the shooting function described in any one of the above embodiments.

Those skilled in the art shall appreciate that the embodiments of the disclosure may be embodied as a method, a system or a computer program product. Therefore the disclosure may be embodied in the form of an all-hardware embodiment, an all-software embodiment or an embodiment of software and hardware in combination. Furthermore, the disclosure may be embodied in the form of a computer program product embodied in one or more computer useable storage mediums (including but not limited to a disk memory, a CD-ROM, an optical memory, etc.) in which computer useable program codes are contained.

The disclosure has been described with reference to flow charts and/or block diagrams of the method, the device (system) and the computer program product according to the embodiments of the disclosure. It shall be appreciated that respective flows and/or blocks in the flow charts and/or the block diagrams and combinations of the flows and/or the blocks in the flow charts and/or the block diagrams may be embodied in computer program instructions. These computer program instructions may be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow charts and/or the block(s) of the block diagrams.

These computer program instructions may also be stored into a computer readable memory capable of directing the computer or the other programmable data processing device to operate in a specific manner so that the instructions stored in the computer readable memory create manufactures including instruction means which perform the functions specified in the flow(s) of the flow charts and/or the block(s) of the block diagrams.

These computer program instructions may also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow charts and/or the block(s) of the block diagrams.

Although the preferred embodiments of the disclosure have been described, those skilled in the art benefiting from the underlying inventive concept may make additional modifications and variations to these embodiments. Therefore the appended claims are intended to be construed as encompassing the preferred embodiments and all the modifications and variations coming into the scope of the disclosure.

Evidently those skilled in the art may make various modifications and variations to the disclosure without departing from the spirit and scope of the disclosure. Thus the disclosure is also intended to encompass these modifications and variations thereto so long as these modifications and variations come into the scope of the claims appended to the disclosure and their equivalents.

The invention claimed is:

1. A processing method of a scene image of a device with a shooting function, comprising:

determining a first combined region and a second combined region in a pre-shot image of a shot scene according to gray values of respective pixels in the pre-shot image, wherein the first combined region contains at least one highlight region, and a remaining region excluding the first combined region in the pre-shot image is the second combined region;

determining a first exposure according to a mean value of gray values of respective pixels in the first combined region, and determining a second exposure according to a mean value of gray values of respective pixels in the second combined region;

shooting the shot scene respectively at the first exposure and the second exposure to obtain a first image and a second image;

adjusting respectively gray values of respective pixels in a first image region corresponding to the first combined region in the first image, and gray values of respective pixels in a second image region corresponding to the second combined region in the second image;

splicing the adjusted first image region and the adjusted second image region to obtain the scene image of the shot scene.

2. The method of claim 1, wherein the operation of determining the first combined region and the second combined region in the pre-shot image of the shot scene according to the gray values of the respective pixels in the pre-shot image comprises:

determining an intermediate gray value according to a mean value of a maximum gray value and a minimum gray value among the gray values of the respective pixels in the pre-shot image;

determining a region, of which a region area is larger than a preset threshold value and in which gray values of respective pixels are all larger than the intermediate gray value, in the pre-shot image as a highlight region;

determining at least one highlight region as the first combined region.

3. The method of claim 1, wherein the operation of adjusting respectively the gray values of the respective pixels in the first image region and the gray values of the respective pixels in the second image region comprises:

determining a gray adjusting coefficient according to a maximum gray value and a minimum gray value among the gray values of the respective pixels in the first image region and a maximum gray value and a minimum gray value among the gray values of the respective pixels in the second image region;

adjusting respectively the gray values of the respective pixels in the first image region and the gray values of the respective pixels in the second image region according to the gray adjusting coefficient and a gray adjusting formula, wherein the gray adjusting formula is:

$$a' = a - (a - a_0) * k$$

wherein a' refers to an adjusted gray value; a refers to an unadjusted gray value; $a_0$ refers to an adjustment approaching value, if the gray value is decreased, the value of $a_0$ is a pre-defined minimum gray value, and if the gray value is increased, the value of $a_0$ is a pre-defined maximum gray value; k refers to the gray adjusting coefficient.

4. The method of claim 3, wherein the gray adjusting coefficient k is determined in a following manner:

determining a total gray adjusting amount Q=M−N according to a difference between the maximum gray value M among the gray values of the respective pixels in the second image region and the minimum gray value N among the gray values of the respective pixels in the first image region;

determining a difference $Q_1$ between a maximum gray value and a minimum gray value among the gray values of the respective pixels in the first combined region;

determining a difference $Q_2$ between a maximum gray value and a minimum gray value among the gray values of the respective pixels in the second combined region;

when adjusting the gray values of the respective pixels in the first image region, determining the gray adjusting coefficient to be $$k = \frac{M-N}{|N-a_0|} * \frac{Q_2}{Q_1+Q_2};$$

when adjusting the gray values of the respective pixels in the second image region, determining the gray adjusting coefficient to be $$k = \frac{M-N}{|M-a_0|} * \frac{Q_1}{Q_1+Q_2}.$$

5. A device with a shooting function, comprising:
a memory; and
one or more processors,
wherein the memory stores computer-readable program codes, and the one or more processors are used to execute the computer-readable program codes to implement:

determining a first combined region and a second combined region in a pre-shot image of a shot scene according to gray values of respective pixels in the pre-shot image, wherein the first combined region contains at least one highlight region, and a remaining region excluding the first combined region in the pre-shot image is the second combined region;

determining a first exposure according to a mean value of gray values of respective pixels in the first combined region, and determining a second exposure according to a mean value of gray values of respective pixels in the second combined region;

shooting the shot scene respectively at the first exposure and the second exposure to obtain a first image and a second image;

adjusting respectively gray values of respective pixels in a first image region corresponding to the first combined region in the first image, and gray values of respective pixels in a second image region corresponding to the second combined region in the second image;

splicing the adjusted first image region and the adjusted second image region to obtain the scene image of the shot scene.

6. The device of claim 5, wherein the operation of determining the first combined region and the second combined region in the pre-shot image of the shot scene according to the gray values of the respective pixels in the pre-shot image specifically comprises:

determining an intermediate gray value according to a mean value of a maximum gray value and a minimum gray value among the gray values of the respective pixels in the pre-shot image;

determining a region, of which a region area is larger than a preset threshold value and in which gray values of respective pixels are all larger than the intermediate gray value, in the pre-shot image as a highlight region;

determining at least one highlight region as the first combined region.

7. The device of claim 5, wherein the operation of adjusting respectively the gray values of the respective pixels in the first image region and the gray values of the respective pixels in the second image region specifically comprises:

determining a gray adjusting coefficient according to a maximum gray value and a minimum gray value among the gray values of the respective pixels in the first image region and a maximum gray value and a minimum gray value among the gray values of the respective pixels in the second image region;

adjusting respectively the gray values of the respective pixels in the first image region and the gray values of the respective pixels in the second image region according to the gray adjusting coefficient and a gray adjusting formula, wherein the gray adjusting formula is:

$$a' = a - (a - a_0) * k$$

wherein a' refers to an adjusted gray value; a refers to an unadjusted gray value; $a_0$ refers to an adjustment approaching value, if the gray value is decreased, the value of $a_0$ is a pre-defined minimum gray value, and if the gray value is increased, the value of $a_0$ is a pre-defined maximum gray value; k refers to the gray adjusting coefficient.

8. The device of claim 7, wherein the gray adjusting coefficient k is determined in a following manner:
   determining a total gray adjusting amount $Q=M-N$ according to a difference between the maximum gray value M among the gray values of the respective pixels in the second image region and the minimum gray value N among the gray values of the respective pixels in the first image region;
   determining a difference $Q_1$ between a maximum gray value and a minimum gray value among the gray values of the respective pixels in the first combined region;
   determining a difference $Q_2$ between a maximum gray value and a minimum gray value among the gray values of the respective pixels in the second combined region;
   when adjusting the gray values of the respective pixels in the first image region, determining the gray adjusting coefficient to be $$k = \frac{M-N}{|N-a_0|} * \frac{Q_2}{Q_1+Q_2};$$

when adjusting the gray values of the respective pixels in the second image region, determining the gray adjusting coefficient to be $$k = \frac{M-N}{|M-a_0|} * \frac{Q_1}{Q_1+Q_2}.$$

9. A non-transitory storage medium storing computer-readable program codes, wherein the computer-readable program codes are executed by one or more processors to implement:
   determining a first combined region and a second combined region in a pre-shot image of a shot scene according to gray values of respective pixels in the pre-shot image, wherein the first combined region contains at least one highlight region, and a remaining region excluding the first combined region in the pre-shot image is the second combined region;
   determining a first exposure according to a mean value of gray values of respective pixels in the first combined region, and determining a second exposure according to a mean value of gray values of respective pixels in the second combined region;
   shooting the shot scene respectively at the first exposure and the second exposure to obtain a first image and a second image;
   adjusting respectively gray values of respective pixels in a first image region corresponding to the first combined region in the first image, and gray values of respective pixels in a second image region corresponding to the second combined region in the second image;
   splicing the adjusted first image region and the adjusted second image region to obtain the scene image of the shot scene.

10. The non-transitory storage medium of claim 9, wherein the operation of determining the first combined region and the second combined region in the pre-shot image of the shot scene according to the gray values of the respective pixels in the pre-shot image specifically comprises: determining an intermediate gray value according to a mean value of a maximum gray value and a minimum gray value among the gray values of the respective pixels in the pre-shot image; determining a region, of which a region area is larger than a preset threshold value and in which gray values of respective pixels are all larger than the intermediate gray value, in the pre-shot image as a highlight region; determining at least one highlight region as the first combined region.

11. The non-transitory storage medium of claim 9, wherein the operation of adjusting respectively the gray values of the respective pixels in the first image region and the gray values of the respective pixels in the second image region specifically comprises: determining a gray adjusting coefficient according to a maximum gray value and a minimum gray value among the gray values of the respective pixels in the first image region and a maximum gray value and a minimum gray value among the gray values of the respective pixels in the second image region;
   adjusting respectively the gray values of the respective pixels in the first image region and the gray values of the respective pixels in the second image region according to the gray adjusting coefficient and a gray adjusting formula, wherein the gray adjusting formula is: $a'=a-(a-a.sub.0)*k$ wherein a' refers to an adjusted gray value; a refers to an unadjusted gray value; $a.sub.0$ refers to an adjustment approaching value, if the gray value is decreased, the value of $a.sub.0$ is a pre-defined minimum gray value, and if the gray value is increased, the value of $a.sub.0$ is a pre-defined maximum gray value; k refers to the gray adjusting coefficient.

12. The non-transitory storage medium of claim 11, wherein the gray adjusting coefficient k is determined in a following manner:
   determining a total gray adjusting amount $Q=M-N$ according to a difference between the maximum gray value M among the gray values of the respective pixels in the second image region and the minimum gray value N among the gray values of the respective pixels in the first image region; determining a difference $Q.sub.1$ between a maximum gray value and a minimum gray value among the gray values of the respective pixels in the first combined region; determining a difference $Q.sub.2$ between a maximum gray value and a minimum gray value among the gray values of the respective pixels in the second combined region; when adjusting the gray values of the respective pixels in the first image region, determining the gray adjusting coefficient to be $k=M-NN-a0*Q2Q1+Q2$ when adjusting the gray values of the respective pixels in the second image region, determining the gray adjusting coefficient to be $k=M-NM-a0*Q1Q1+Q2$.

* * * * *